US009924624B1

(12) United States Patent
Cromwell

(10) Patent No.: US 9,924,624 B1
(45) Date of Patent: Mar. 27, 2018

(54) APPARATUS FOR COMBINING PLANTING IMPLEMENTS

(71) Applicant: Jeffrey H. Cromwell, Camden, AL (US)

(72) Inventor: Jeffrey H. Cromwell, Camden, AL (US)

( * ) Notice: Subject to any disclaimer, the term of this patent is extended or adjusted under 35 U.S.C. 154(b) by 0 days.

(21) Appl. No.: 15/231,460

(22) Filed: Aug. 8, 2016

Related U.S. Application Data

(60) Provisional application No. 62/201,641, filed on Aug. 6, 2015.

(51) Int. Cl.
| | |
|---|---|
| *A01B 49/06* | (2006.01) |
| *A01C 17/00* | (2006.01) |
| *A01C 15/00* | (2006.01) |
| *A01B 59/043* | (2006.01) |
| *A01B 59/06* | (2006.01) |
| *A01B 63/02* | (2006.01) |

(Continued)

(52) U.S. Cl.
CPC .............. *A01B 49/06* (2013.01); *A01B 21/00* (2013.01); *A01B 59/043* (2013.01); *A01B 59/066* (2013.01); *A01B 63/02* (2013.01); *A01C 7/08* (2013.01); *A01C 15/005* (2013.01); *A01C 17/001* (2013.01)

(58) Field of Classification Search
CPC combination set(s) only.
See application file for complete search history.

(56) References Cited

U.S. PATENT DOCUMENTS

| | | | |
|---|---|---|---|
| 3,398,707 | A | 8/1968 | McClenny |
| 3,810,434 | A | 5/1974 | van der Lely et al. |

(Continued)

FOREIGN PATENT DOCUMENTS

| | | |
|---|---|---|
| EP | 201785 | 11/1986 |
| EP | 313835 | 5/1989 |
| EP | 327869 | 8/1989 |

OTHER PUBLICATIONS

Plotmaster; advertisement from Quality Whitetails magazine, Apr./May 2014 edition.

(Continued)

*Primary Examiner* — Alicia Torres
(74) *Attorney, Agent, or Firm* — Jonathan C. Hill; Bradley Arant Boult Cummings LLP

(57) ABSTRACT

An apparatus for combining planting implements enables an operator of a tractor to use both a conventional cultivating implement and a conventional broadcasting implement simultaneously. The apparatus is rigidly affixed to a conventional cultivating implement and comprises a support frame, a pair of brackets, and a connection bar. In combination, the support frame, pair of brackets, and connection bar provide a three-point connection whereby a conventional broadcasting implement may be attached thereto, thus enabling an operator of a tractor to use both a conventional cultivating implement and a conventional broadcasting implement simultaneously. In operation, at least a portion of the conventional cultivating implement is disposed behind the conventional broadcasting implement when the conventional broadcasting implement is attached to the support frame, thereby allowing simultaneous cultivation and broadcasting of constituents.

23 Claims, 8 Drawing Sheets

(51) Int. Cl.
*A01B 21/00* (2006.01)
*A01C 7/08* (2006.01)

(56) References Cited

U.S. PATENT DOCUMENTS

| | | | | |
|---|---|---|---|---|
| 3,822,656 | A | | 7/1974 | Lalor |
| 3,893,515 | A | | 7/1975 | Sadler |
| 4,088,083 | A | * | 5/1978 | Dail, Jr. .................. A01B 33/16 |
| | | | | 111/13 |
| 4,235,376 | A | | 11/1980 | Cohen et al. |
| 4,991,781 | A | * | 2/1991 | Barbieri ............... A01C 15/005 |
| | | | | 239/661 |
| 5,158,411 | A | | 10/1992 | Kemmner |
| 5,461,993 | A | | 10/1995 | Ikumoto et al. |
| 6,193,259 | B1 | * | 2/2001 | Rupard ................ A01B 59/043 |
| | | | | 172/275 |
| 2002/0024195 | A1 | * | 2/2002 | Heller .................. A01B 59/043 |
| | | | | 280/504 |
| 2004/0256124 | A1 | * | 12/2004 | White .................. A01B 59/043 |
| | | | | 172/439 |

OTHER PUBLICATIONS

The Firminator; Ranew's Outdoor Equipment; advertisement from Quality Whitetails magazine, Apr./May 2014 edition.

* cited by examiner

300

APPARATUS FOR COMBINING PLANTING IMPLEMENTS

CROSS-REFERENCE TO RELATED APPLICATIONS

This application claims the benefit of and priority to U.S. Provisional Patent Application No. 62/201,641 entitled "Combination Bracket for Cultivating Implement" and filed on Aug. 6, 2015.

BACKGROUND OF THE INVENTION

Hunters often plant food plots to provide feed and nutrition to the game they are hunting, such as deer and wild turkey. The planting process typically involves the use of a tractor and at least two of its standard implements: a cultivating implement, such as a disk harrow, to break up the soil and a broadcasting implement, such as a broadcast spreader, to disperse seed and fertilizer into the turned-up earth.

Such cultivating and broadcasting implements may also be used by farmers to plant crops, and the invention disclosed herein works equally well in farming applications. For purposes of this application, reference is made to a disk harrow as an exemplary cultivating implement and a broadcast spreader as an exemplary broadcasting implement. The invention disclosed herein works equally well with many other combinations of cultivating and broadcasting implements.

Prior to the invention disclosed herein, a typical process for planting food plots or other crops using a tractor, a cultivating implement, and a broadcasting implement required the following steps: attach the cultivating implement to the tractor using the tractor's standard means for implement connection, or three-point hitch; operate the tractor to pull the cultivating implement over an area of ground to cultivate it and expose previously submerged soil; disconnect the cultivating implement from the tractor; attach a broadcasting implement to the tractor using the tractor's three-point hitch; connect the tractor's power take-off ("PTO") to the broadcasting implement; add desired constituents to the broadcasting implement, such as seed and fertilizer; operate the tractor and broadcasting implement to broadcast the constituents over the turned up soil; disconnect the broadcasting implement from the tractor; reattach the cultivating implement to the tractor using the tractor's three-point hitch; and operate the tractor to pull the cultivating implement over the cultivated area to cover up the seed and fertilizer. The last two steps of the process may often be accomplished by other means, but, as a practical matter, the cultivating implement is often used both to disturb the soil initially and later to cover up the broadcasted constituents.

The process for disconnecting the cultivating implement and attaching the broadcasting implement, and vice versa, is not an easy one to accomplish, especially out in the field, where it may be difficult to find flat, solid terrain to facilitate the changing out of the implements (and lining up the connection points of the tractor's three-point hitch with the corresponding connection points on the implement to be attached). Moreover, if multiple locations are to be planted, the planting process requires either (1) changing out the implements a large number of times, which makes the planting process more time consuming, runs the risk of losing the means for connecting the respective implements to the tractor (such as hitch pins), requires additional labor; and increases the likelihood of damaging equipment or injuring the operator(s); or (2) traveling to each planting location three separate times—one to cultivate the soil (with the cultivating implement), one to disperse seed and fertilizer (with the broadcasting implement), and one to cover up or bury the seed and fertilizer in the soil (with the cultivating implement). This latter process adds time to the planting process, causes more wear and tear on the tractor and respective implements, and is more expensive to the operator in terms of fuel costs and wear and tear on equipment.

The invention disclosed herein eliminates these problems by enabling its user to operate a tractor with both a cultivating implement and a broadcasting implement, such as a disk harrow and a broadcast spreader, connected to the tractor and serving their respective functions at the same time. This arrangement eliminates the need to switch out implements repeatedly or the requirement to visit planting sites multiple times, thereby saving time, money, labor, and wear and tear on equipment. The invention disclosed herein further increases the efficiency of the planting process by enabling one to operate a tractor with multiple conventional cultivating and broadcasting implements in combination, connected to the tractor and serving their respective functions at the same time.

BRIEF SUMMARY OF THE INVENTION

An apparatus for combining planting implements according to an embodiment of the present disclosure enables an operator of a tractor to use a conventional cultivating implement and a conventional broadcasting implement simultaneously. As used herein, "cultivating implement" refers to any one of a number of implements that is typically attached to and used in connection with a tractor to manipulate earth without the need for the tractor's PTO connection. A "broadcasting implement" as used herein is any one of a number of implements that is typically attached to and used in connection with a tractor to broadcast constituents, such as seed and fertilizer, toward the earth—usually earth that has recently been tilled or otherwise disturbed. This broadcasting function typically requires independent rotary power, such as that which may be provided through a tractor's PTO connection.

An apparatus according to an embodiment of the present disclosure comprises a support frame, a pair of brackets, and a connection bar. The support frame of the apparatus comprises two substantially vertical members and a lateral member, and may further comprise one or more frontward support members and one or more rearward support members. Lower ends of the substantially vertical members of the support frame are rigidly affixed to a frame of a cultivating implement by one of any number of suitable means known in the art, such as by welding or by attachment through fasteners. One or more rearward support members may be incorporated into the support frame to provide additional lateral support. In the apparatus according to an embodiment of the present disclosure, a pair of rearward support members run diagonally from upper ends of the substantially vertical members of the support frame to a more rearward portion of the frame of a cultivating implement and are rigidly affixed at both ends.

The lateral member of the support frame of the apparatus spans substantially horizontally across the top of the substantially vertical members and is rigidly affixed to them by one of any number of suitable means known in the art, such as by welding or fasteners. One or more frontward support members may be incorporated into the support frame to provide additional lateral support. In the apparatus according to an embodiment of the present disclosure, a pair of frontward support members run diagonally from a forward-facing side of the lateral member of the support frame to a frontward portion of the frame of a cultivating implement and are rigidly affixed at both ends.

A pair of brackets are rigidly affixed to inside walls of the substantially vertical members of the support frame such that the brackets are inwardly opposed to one another and positioned approximately halfway in between mid-points of the substantially vertical members and their upper ends, said substantially vertical members being spaced at a distance from one another sufficient to render the brackets a suitable distance apart from one another such that said distance approximates that of the distance between the lower two connection points of the conventional three-point hitch connection system well known in the art and incorporated into a broadcasting implement to be connected. The brackets are disposed to accept the protrusions of a conventional broadcasting implement that form its two lower connection points. In the apparatus according to an embodiment of the present disclosure, the brackets are U-shaped, angled rearwardly, and have holes in their frontward and rearward faces. These holes may be aligned with the holes in the protrusions of a broadcasting implement to allow the broadcasting implement to be attached to the support frame by one of any number of means well known in the art, such as by hitch pins.

A connection bar is rigidly affixed to the top of the lateral member approximately at its mid-point. The connection bar runs vertically from the lateral member upward. In the apparatus according to an embodiment of the present disclosure, the width of the connection bar is greater than the width of the lateral member, such that a frontward portion of the connection bar extends down in front of the lateral member to provide an additional anchor point for one or more frontward support members. At its upper end, the connection bar has a hole (if solid) or holes (if hollow) running through its sides, such that if an axis were drawn through the hole or holes, it would be perpendicular to the direction of travel of the implement and situated in a horizontal plane. The height of the connection bar is selected to render its hole or holes, in combination with the holes in the brackets, to positionally mirror the connection points of a conventional broadcasting implement's three point hitch connection, thereby permitting the broadcasting implement to be attached to the support frame, said attachment to be accomplished by one of any number of means well known in the art, such as by hitch pins.

The apparatus according to an embodiment of the present disclosure is affixed to a cultivating implement. Upon affixation, a broadcasting implement may then be attached to the apparatus using the connection points provided by the brackets and connection bar, which in effect serve to replace a tractor's three-point hitch system by which the broadcasting implement would typically be connected to a tractor. The combined system—cultivating implement, apparatus, and broadcasting implement, in combination—may then be connected to a tractor using the connection points of the cultivating implement's three point hitch connection. The tractor's PTO may then be connected to the broadcasting implement, permitting simultaneous operation of both a cultivating implement and a broadcasting implement.

It is an advantage of the present disclosure that the apparatus allows an operator of a tractor to operate simultaneously multiple conventional planting implements, particularly a cultivating implement and a broadcasting implement, and, more particularly, implements well known in the art that he or she may already own. It is a further advantage of the present disclosure that the apparatus enables a user to cultivate soil and to broadcast seed and fertilizer into the soil simultaneously using conventional cultivating and broadcasting implements. It is a further advantage of the present disclosure that the apparatus allows an operator to use multiple conventional planting implements, such as a cultivating implement and a broadcasting implement, simultaneously, with at least a portion of the cultivating implement disposed behind the broadcasting implement to permit constituent broadcasting and cover-up to be performed simultaneously.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of an exemplary embodiment having reference to the attached figures, the invention not being limited to any particular embodiment(s) disclosed.

Figure 1:
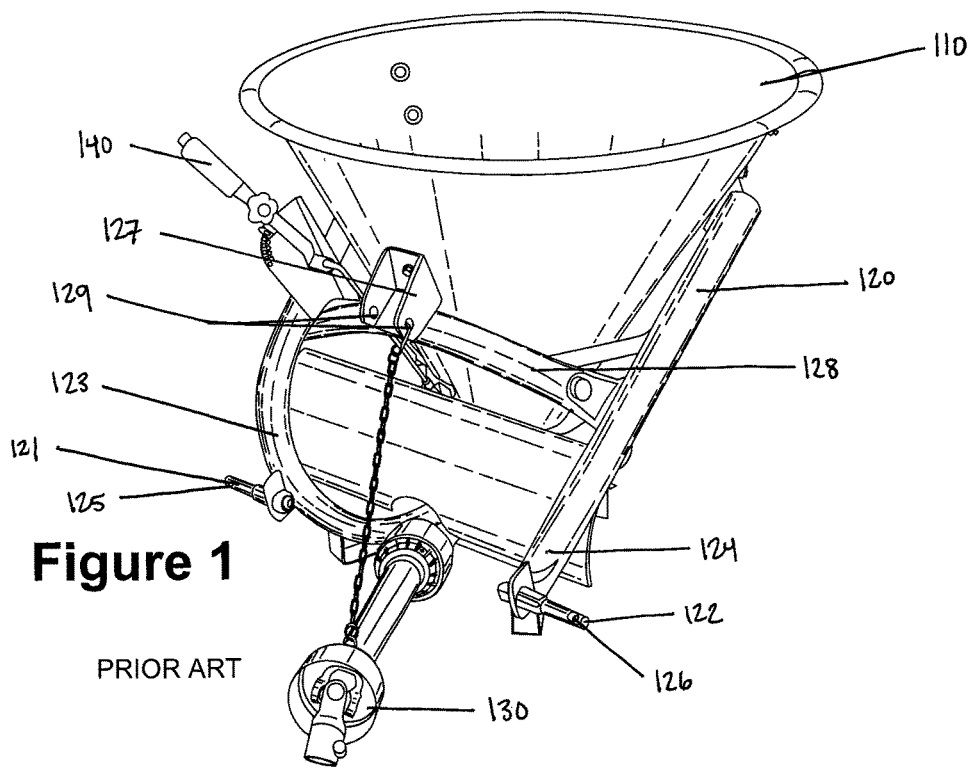
FIG. 1 is a perspective view of a conventional broadcasting implement, a broadcast spreader.

Repeat use of reference characters throughout the present specification and appended drawings is intended to represent the same or analogous features or elements of the invention.

DETAILED DESCRIPTION OF THE INVENTION

The invention described herein is to be used to combine a conventional cultivating implement known in the art with a conventional broadcasting implement known in the art and, more specifically, to be used to permit a conventional cultivating implement and a conventional broadcasting implement to be combined and used simultaneously. Accordingly, two conventional planting implements to which the invention described herein may be applied are depicted and described first, followed by a detailed description of a preferred embodiment of the invention. The invention described herein may be used to combine other planting implements known in the art, said combinations being readily ascertainable by persons of skill in the art after reviewing the instant disclosure. Further, the dimensions of the invention described herein are in part dependent upon the standard means of connecting implements to tractors known in the art, namely the three-point hitch. The dimensions of the three-point hitch, in turn, vary according to the power of the tractor and the size of the implements being used. It will be readily understood by a person of skill in the art to adjust the dimensions of the components of the invention described herein based on the size of the tractor and implements to be used and the respective dimensions of their three-point hitch connections.

Referring to FIG. 1, a conventional broadcasting implement, broadcast spreader 100, comprises a funnel 110, a frame 120, a PTO connection 130, a dispersion control lever 140, and a means for propagating and regulating dispersion at the base of the funnel (not depicted). The funnel 110 is rigidly affixed to the frame 120 and is disposed to accept and hold constituents for dispersal, such as seed and fertilizer. The frame 120 provides a means for connecting the broadcast spreader 100 to a tractor (not depicted) via a standard configuration of three connection points well known in the art, or three-point hitch connection system. Two of the connection points on the broadcast spreader 100 are provided by outwardly opposed protrusions 121, 122 attached to and rotatably engaged with lower ends 123, 124 of the frame 120. Holes 125, 126 pass through each of the outwardly opposed protrusions 121 and 122 and provide a means for connecting the broadcast spreader 100 with a tractor (not shown) via the two lower connection points of the tractor's conventional three-point hitch connection system. The third connection point on the broadcast spreader 100 is established by a bracket 127, which is rigidly affixed to the funnel 110 and a lateral member 128 of the frame 120. The bracket 127 contains a pair of holes 129, which provide a means for connecting the broadcast spreader 100 with a tractor (not shown) via a third, upper connection point of the conventional three-point hitch connection system.

To use the broadcast spreader 100, an operator of a tractor aligns the holes 125, 126, 129 with the tractor's three-point hitch and secures the broadcast spreader 100 to the tractor by one of any number of means known in the art including, for example, with hitch pins. The PTO connection 130 of the broadcast spreader 100 is then rotatably engaged with the power take-off of the tractor (not shown) to provide rotary power to broadcast the constituents held in the funnel 110, said broadcasting function being controlled with the dispersion control lever 140 in combination with a means for propagating and regulating dispersion (not shown). The operator then operates the tractor and uses the power take-off function of the tractor to disperse the constituents in the funnel 110 onto a desired area of earth.

Figure 2:
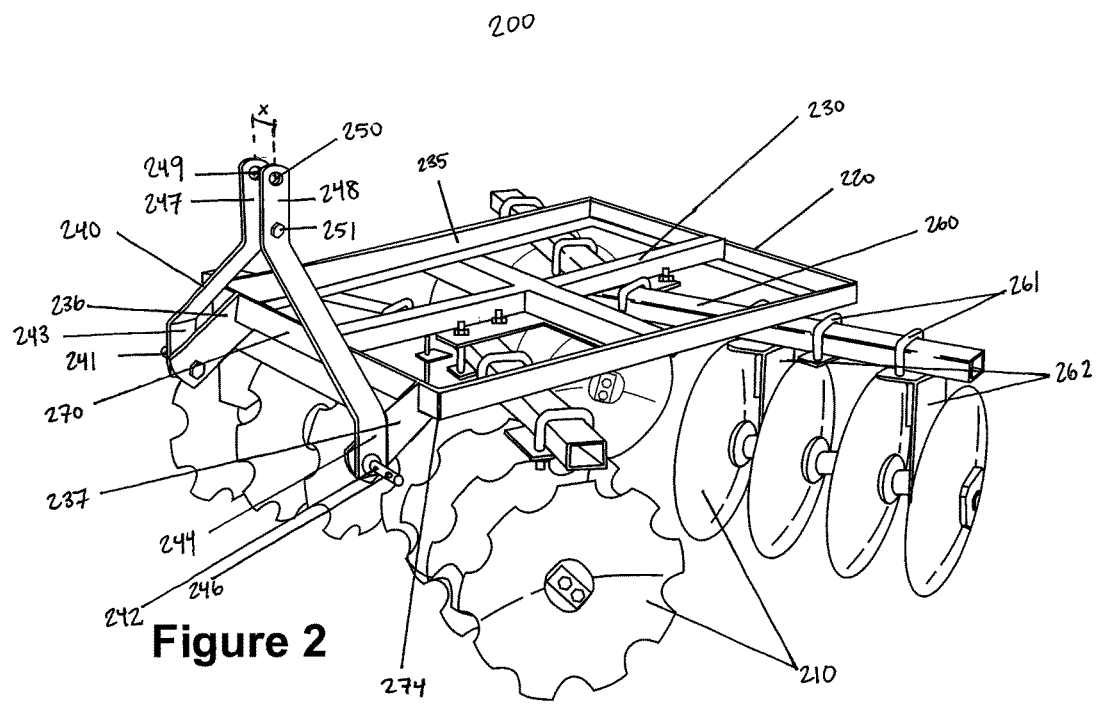
FIG. 2 is a perspective view of a conventional cultivating implement, a disk harrow.
Figure 3:
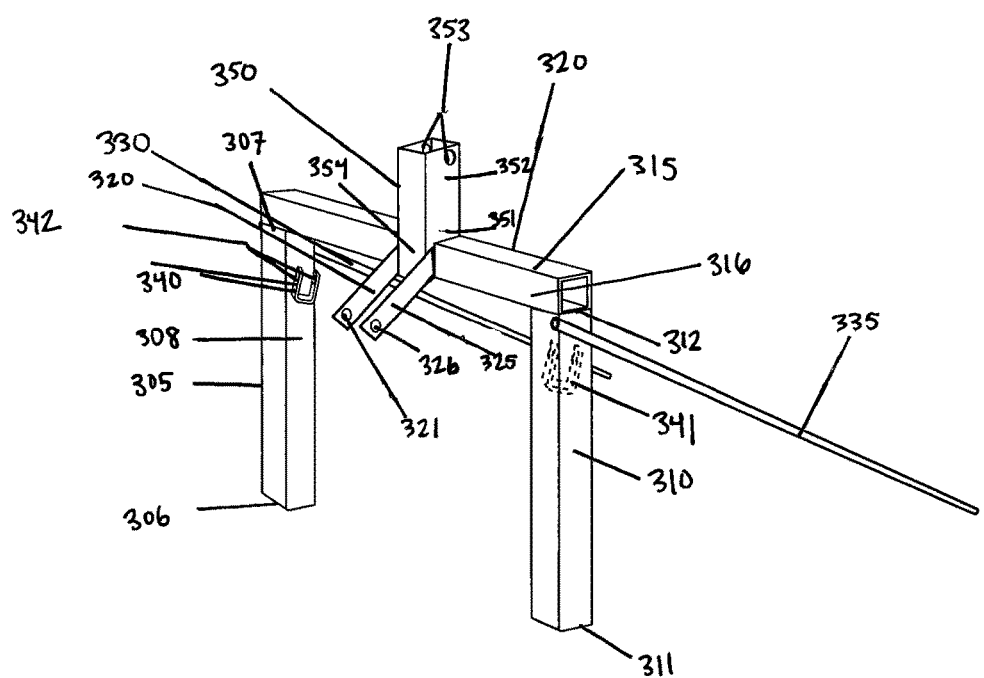
FIG. 3 is a perspective view of an apparatus according to an embodiment of the present disclosure.
Figure 4:
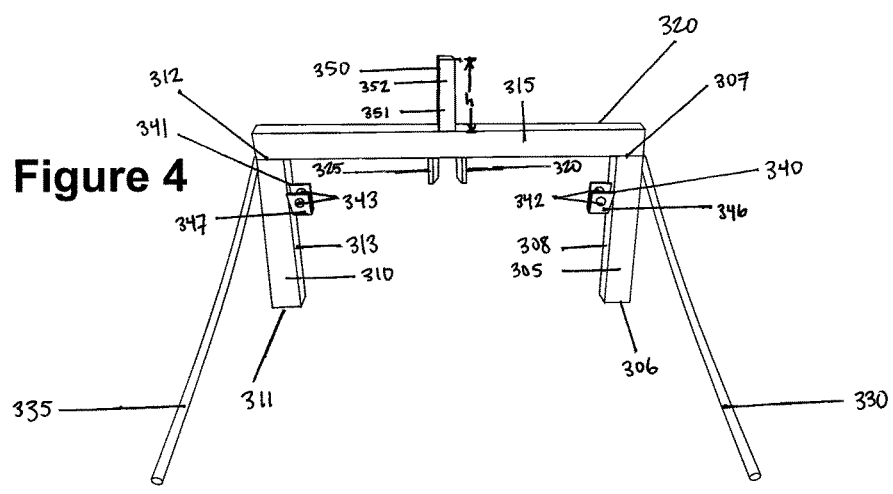
FIG. 4 is a rear view of the apparatus of FIG. 3.
Figure 5:
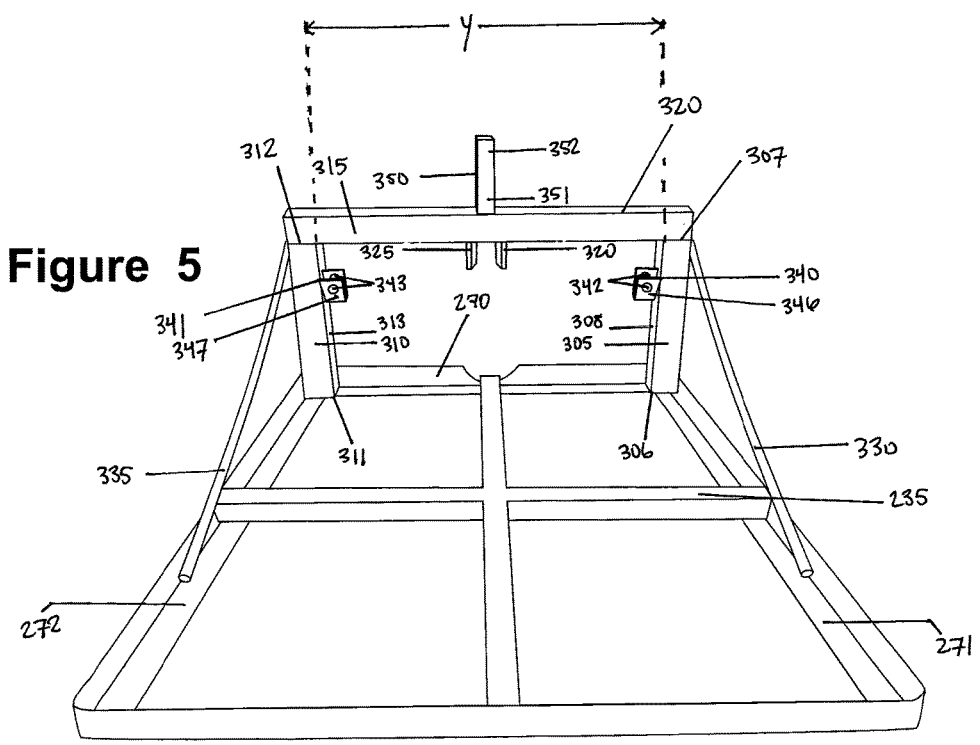
FIG. 5 is a rear view of the apparatus of FIG. 3 depicting the apparatus rigidly affixed to an upper portion of a frame of the disk harrow depicted in FIG. 2.
Figure 6:
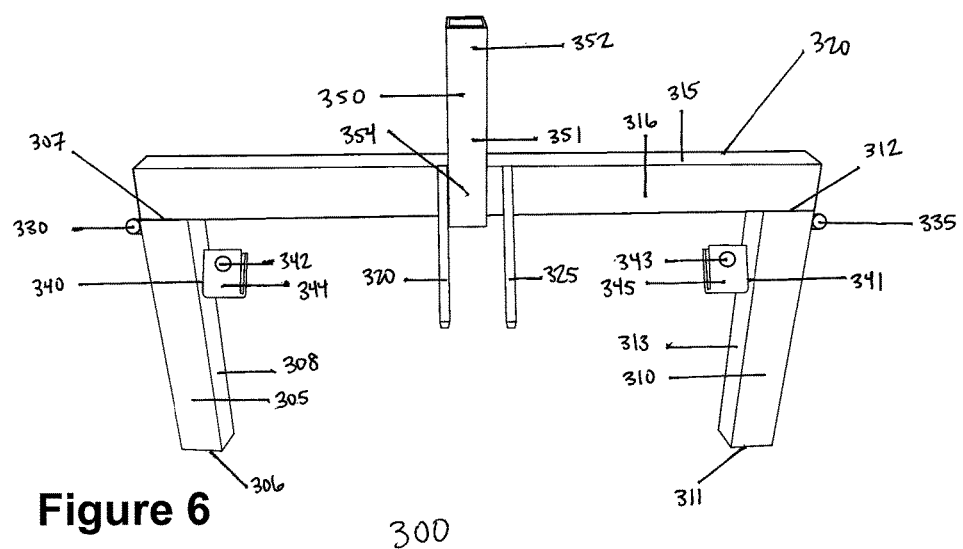
FIG. 6 is a front view of the apparatus of FIG. 3.

Referring to FIG. 2, a conventional cultivating implement, disk harrow 200, comprises a plurality of disks 210 and a frame 220. The frame further comprises an upper portion 230 rigidly affixed to a lower portion 260. The plurality of disks 210 is attached to the lower portion 260 of the frame 220 by any number of means known in the art including, for example, with a plurality of U-bolts 261 and brackets 262. The upper portion 230 of the frame 220 further comprises a rear section 235 and a front section 240. The rear section 235 of the upper portion 230 of the frame 220 is generally rectilinear in shape, rigidly affixed to the lower portion 260 of the frame 220, and positioned in the horizontal plane above the lower portion 260 of the frame 220 and the plurality of disks 210 affixed thereto. The front section 240 of the upper portion 230 of the frame 220 is typically disposed in the vertical plane and in the general form of an upside-down capital "Y" so as to provide a means for connecting the disk harrow 200 to a tractor (not depicted) via the tractor's conventional three-point hitch connection system. Two of the connection points on the disk harrow 200 are provided by outwardly opposed protrusions 241, 242 attached to and rotatably engaged with lower ends 243, 244 of the front section 240 of the upper portion 230 of the frame 220. Holes 245, 246 (hole 245 in outwardly opposed protrusion 241 is obstructed from view in FIG. 2) pass through each of the outwardly opposed protrusions 241, 242 and provide a means for connecting the disk harrow 200 with a tractor (not shown) via the two lower connection points of the tractor's conventional three-point hitch connection system. Upper ends 247, 248 of the front section 240 of the upper portion 230 of the frame 220 are disposed in the vertical plane and substantially parallel. Further, upper ends 247, 248 are positioned with a gap (x) between them and have holes 249, 250 to provide a means for connecting the disk harrow 200 with a tractor (not shown) via a third, upper connection point of the tractor's conventional three-point hitch connection system. A spacing bolt 251 is used to connect the upper ends 247, 248 to one another and maintain the gap (x). Further, in the conventional disk harrow 200 depicted in FIG. 2, the rear section 235 and front section 240 of the upper portion 230 of the frame 220 are rigidly affixed to one another by linking arms 236, 237.

To use the disk harrow 200, an operator of a tractor aligns the holes 245, 246 of the outwardly opposed protrusions 241, 242 and the holes 249, 250 with the tractor's conventional three point hitch connection system and secures the disk harrow 200 to the tractor by one of any number of means known in the art including, for example, with hitch pins. The operator then operates the tractor and pulls the plurality of disks 210 over a desired area of land to be cultivated.

Having described a conventional broadcasting implement and a conventional cultivating implement to which the invention described herein may be applied, the disclosure will now address an exemplary embodiment of the invention. Referring to FIGS. 3-7, an exemplary embodiment of an apparatus for combining planting implements 300—more specifically, for combining a conventional broadcasting implement, or broadcast spreader 100, with a conventional cultivating implement, or disk harrow 200—comprises a support frame 320, a pair of brackets 340, 341 (it being understood that bracket 341 is depicted using dotted lines in FIG. 3 because it is located behind the support frame 320 and thereby blocked from view), and a connection bar 350. The support frame 320 further comprises two substantially vertical members 305, 310, a lateral member 315, a pair of frontward support members 320, 325 and a pair of rearward support members 330, 335. The support frame 320 may be fabricated from any suitably strong and rigid material, such as aluminum, stainless steel, any other ferrous or non-ferrous metal, composites (such as carbon fiber or graphite), plastics, or wood.

The substantially vertical members 305, 310 of the support frame 320 are further comprised of lower ends 306, 311 and upper ends 307, 312. The lower ends 306, 311 are rigidly affixed to a frame of a cultivating implement. In the exemplary embodiment depicted in FIGS. 3-7 (and referring as needed to FIG. 2), the cultivating implement is a disk harrow 200 as depicted in FIG. 2, and the lower ends 306, 311 of the substantially vertical members 305, 310 of the support frame 320 are rigidly affixed to a front side 270 of the rear section 235 of the upper portion 230 of the frame 220 of the disk harrow 200. This connection may be accomplished by one of any number of methods known in the art, such as by welding or by the use of fasteners.

The upper ends 307, 312 of the substantially vertical members 305, 310 of the support frame 320 are rigidly affixed to and connected by lateral member 315 of the support frame 320. This connection may be accomplished by one of any number of methods known in the art, such as by welding or by the use of fasteners. In the embodiment illustrated in FIGS. 3-7, the substantially vertical members 305, 310 measure about two (2) feet in height, but this height may be adjusted as necessary to achieve the desired results for implement attachment and constituent dispersion, a suitable height being readily determinable by one of skill in the art.

In the exemplary embodiment depicted in FIGS. 3-7, a pair of rearward support members 330, 335 are incorporated into the support frame 320 to provide additional lateral support. The rearward support members 330, 335 run diagonally from upper ends 307, 312 of the substantially vertical members 305, 310 of the support frame 320 to rearward portions 271, 272 of the rear section 235 of the upper portion 230 of the frame 220 of the disk harrow 200 and are rigidly affixed at either end by one of any number of methods known in the art, such as by welding or by the use of fasteners.

In the exemplary embodiment depicted in FIGS. 3-7, a pair of frontward support members 320, 325 are incorporated into the support frame 320 to provide additional lateral support. The frontward support members 320, 325 run diagonally from a forward-facing side 316 of the lateral member 315 of the support frame 320 of the apparatus 300 to the upper ends 247, 248 of the front section 240 of the upper portion 230 of the frame 220 of the disk harrow 200. The frontward support members 320, 325 are rigidly affixed to the lateral member 315 by one of any number of methods known in the art, such as by welding or by the use of fasteners. The frontward support members 320, 325 are rigidly affixed to and tied into the frame 220 of the disk harrow 200 at spacing bolt 251. The frontward support members 320, 325 have holes 321, 326 to facilitate this connection. Specifically, the spacing bolt 251 of the disk harrow 200 may be removed and then reattached to run through holes 321, 326 in addition to its previous connection points on the frame 220. The spacing bolt 251 of the conventional disk harrow 200 may need to be replaced with a lengthier spacing bolt to permit this fastener connection, the need for a replacement being readily determinable by a person of skill in the art.

A pair of brackets 340, 341 are rigidly affixed to inside walls 308, 313 of the substantially vertical members 305, 310 of the support frame 320 such that the brackets 340, 341 are inwardly opposed to one another and positioned approximately halfway in between mid-points of the substantially vertical members 305, 310 and their upper ends 307, 312. Referring to FIG. 1 as necessary, in the exemplary embodiment described herein, the brackets 340, 341 are disposed to accept the protrusions of a conventional broadcasting implement, such as the outwardly opposed protrusions 121, 122 of broadcast spreader 100, which form the two lower connection points of the conventional three-point hitch connection system embodied in conventional broadcasting implements. In the apparatus according to an embodiment of the present disclosure, the brackets 340, 341 are U-shaped, are angled rearwardly, and have pairs of holes 342, 343 in their frontward 344, 345 and rearward 346, 347 faces. These pairs of holes 342, 343 may be aligned with the holes 125, 126 in the outwardly opposed protrusions 121, 122 of the broadcast spreader 100 to enable the broadcast spreader 100 to be attached to the support frame 320 of the apparatus 300 by one of any number of means well known in the art, such as by hitch pins.

The distance between the inside walls 308, 313 of substantially vertical members 305, 310 of the support frame 320 (depicted as "y" in FIG. 5) is dictated by the distance between the lower connection points of the conventional three-point hitch connection system embodied in the broadcasting implement to be used with the invention. In the exemplary embodiment described herein, the broadcasting implement is a broadcast spreader 100 as depicted in FIG. 1, and the distance between the centers of the holes 125, 126 in the outwardly opposed protrusions 121, 122 of the broadcast spreader 100 dictates and specifies the distance between the centers of the pairs of holes 342, 343 in the brackets 340, 341 of the apparatus 300, which in turn dictates the distance (y) between the inside walls 308, 313 of substantially vertical members 305, 310. The distance between the centers of the holes 125, 126 should be roughly the same as the distance between the centers of the pairs of holes 342, 343 in the brackets 340, 341. In the exemplary embodiment depicted in FIGS. 3-7, this distance coincides with positioning the lower ends 306, 311 of the substantially vertical members 305, 310 of the support frame 320 of the apparatus 300 at front side corners 273, 274 of the front side 270 of the rear section 235 of the upper portion 230 of the frame 220 of the disk harrow 200, but one of skill in the art would be able to readily determine a proper location to affix the lower ends 306, 311 of the substantially vertical members 305, 310 of the support frame 320 of the apparatus 300 to a variety of cultivating implements based on the disclosure herein and the dimensions of the three-point hitch connection system in the broadcasting implement to be used in combination with a particular cultivating implement. Further, in the event that the frame of the cultivating implement is too narrow to permit the substantially vertical members 305, 310 to be affixed to it and spaced apart from one another at a distance sufficient to enable a broadcasting implement to be attached to the apparatus, one of skill in the art would be able to modify the frame of the cultivating implement (such as by extending its width laterally) as necessary to permit the objects of the present invention to be accomplished.

Figure 7:
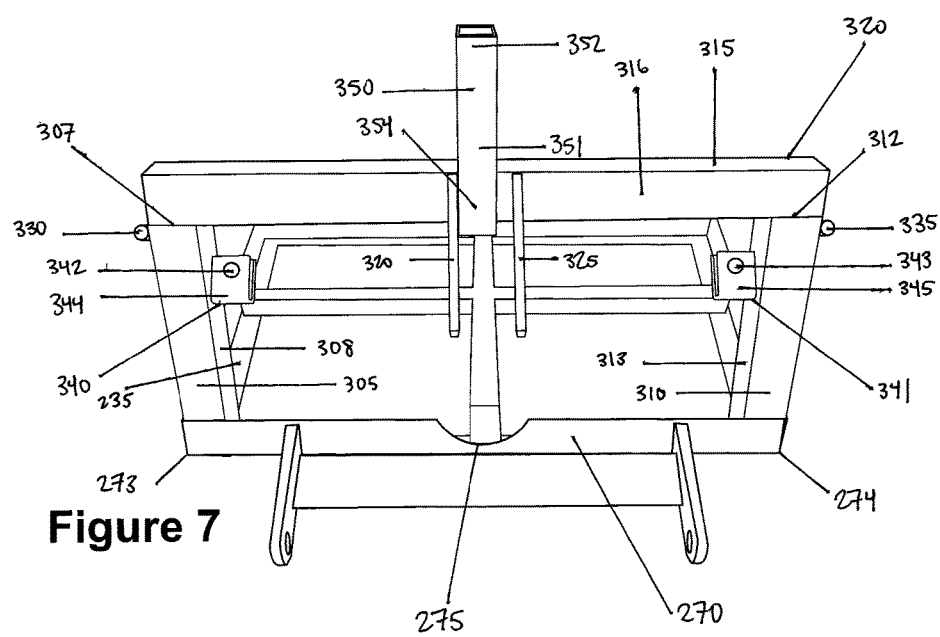
FIG. 7 is a front view of the apparatus of FIG. 3 depicting the apparatus rigidly affixed to the upper portion of the frame of the disk harrow depicted in FIG. 2.

It may be necessary to cut out a portion of the frame of the cultivating implement to enable the PTO connection of the broadcasting implement to be connected with the tractor's PTO when the invention described herein is used to combine a cultivating implement and a broadcasting implement to enable their simultaneous operation. In FIG. 7, cutout portion 275 of the frame 220 of the disk harrow 200 enables the PTO connection 130 of the broadcast spreader 100 to be connected with the tractor's PTO when the apparatus 300 is used to combine the broadcast spreader 100 with the disk harrow 200.

A connection bar 350 is rigidly affixed to lateral member 315 at roughly the mid-point of lateral member 315. A lower portion 351 of connection bar 350 is rigidly affixed to lateral member 315, and connection bar 350 runs upwardly and vertically therefrom. An upper portion 352 of connection bar 350 has a pair of holes 353 disposed in its sides. Referring to FIG. 1 as necessary, in the exemplary embodiment described herein, the pair of holes 353 are disposed to align with a pair of holes of a conventional broadcasting implement, such as the pair of holes 129 in the bracket 127 of broadcast spreader 100, which form the upper connection point of the conventional three-point hitch connection system embodied in broadcast spreader 100. In the apparatus according to an embodiment of the present disclosure, the pair of holes 353 is aligned with the pair of holes 129 in the bracket 127 of broadcast spreader 100 to enable the broadcast spreader 100 to be attached to the support frame 320 of the apparatus 300 by one of any number of means well known in the art, such as by a hitch pin. Further, in the apparatus according to an embodiment of the present disclosure, the width of the connection bar 350 (measured from its frontward-facing side to its rearward facing side) is greater than the width of the lateral member 315, such that a frontward portion 354 of the connection bar 350 extends down in front of the lateral member 315 to provide an additional anchor point for one or more of the frontward support members 320, 325.

The height of the connection bar 350 (as depicted as "h" in FIG. 4) is dictated by the spatial orientation of the connection points of the conventional three-point hitch connection system embodied in the broadcasting implement to be connected to the support frame 320; specifically, the distance between the upper connection point and the midpoint between the lower connection points. In the exemplary embodiment described herein, the broadcasting implement is a broadcast spreader 100 as depicted in FIG. 1, and the distance between the midpoint of a line connecting the pair of holes 129 in the bracket 127 of the broadcast spreader 100 and the midpoint of a line connecting the two lower connection points (established by the holes 125, 126 in the outwardly opposed protrusions 121, 122) dictates and specifies the distance between and the orientation of the pair of holes 353 in the connection bar 350 of the apparatus 300 and the pairs of holes 342, 343 in the brackets 340, 341. Accordingly, one of skill in the art would be able to readily determine a proper height for the connection bar 350 for a variety of applications and combinations based on the disclosure herein and the dimensions of the three-point hitch connection system in the broadcasting implement to be used in combination with a particular cultivating implement.

In an alternative embodiment of the invention disclosed herein, the connection bar 350 may contain a plurality of pairs of holes at varying heights, or may otherwise be adjustable vertically, to provide multiple connection options. Likewise the substantially vertical support members 305, 310 may contain a plurality of attachment points for brackets 340, 341, or may otherwise be adjustable vertically, to provide multiple connection options. These adjustable variations could be readily incorporated into the exemplary embodiment described herein by a person of skill in the art.

Figure 8:
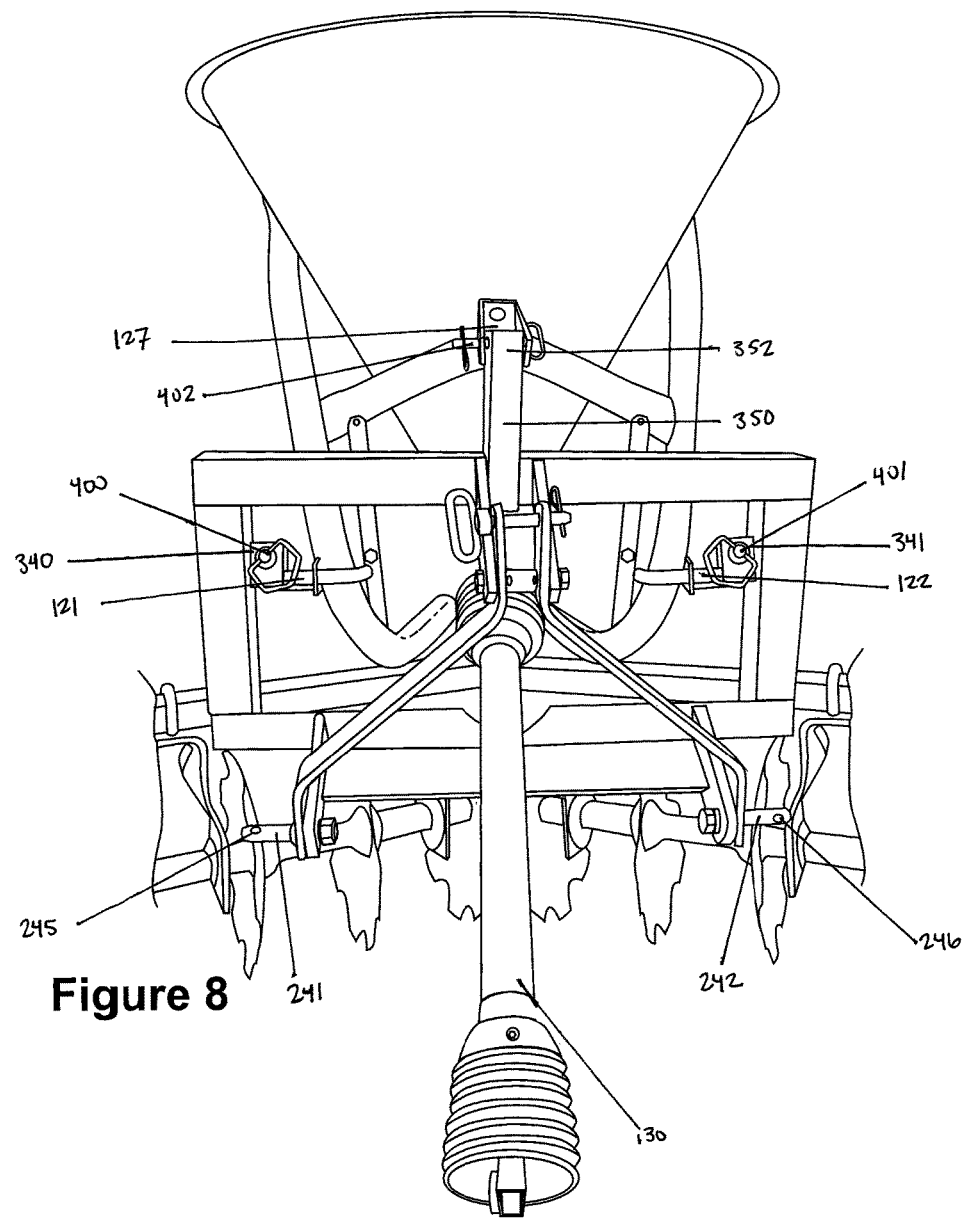
FIG. 8 is a front view of the apparatus of FIG. 3 depicting the apparatus linking the broadcast spreader of FIG. 1 with the disk harrow of FIG. 2.

Finally, FIG. 8 depicts an exemplary embodiment of an apparatus for combining planting implements 300 being used to connect the broadcast spreader 100 of FIG. 1 and the disk harrow 200 of FIG. 2. The outwardly opposed protrusions 121, 122 of the broadcast spreader 100 are positioned in the brackets 340, 341 of the apparatus 300 and connected to the brackets 340, 341 by running hitch pins 400, 401 through the holes 125, 126 (not shown) in the outwardly opposed protrusions 121, 122 of the broadcast spreader 100 and the pairs of holes 342, 343 (not shown) in the brackets 340, 341 of the apparatus 300. Likewise, the pair of holes 129 (not shown) in the bracket 127 of the broadcast spreader 100 are aligned with the pair of holes 353 (not shown) in the upper portion 352 of the connection bar 350 of the apparatus 300 and a hitch pin 402 is placed through the holes and engaged to further secure the broadcast spreader 100 to the apparatus 300. The apparatus 300, in turn, is rigidly affixed to a disk harrow 200 as shown and described in FIGS. 5 and 7. All three of the connection points on the disk harrow 200, including holes 245, 246 in the outwardly opposed protrusions 241, 242 and holes 249, 250 (not shown) remain available to provide a means for connecting the disk harrow 200 to a tractor (not shown) through a tractor's conventional three-point hitch connection system. Likewise, the PTO connection 130 of the broadcast spreader 100 is available to connect to the tractor's PTO. Thus, the exemplary embodiment of an apparatus for combining planting implements 300 enables an operator of a tractor to use multiple conventional planting implements, such as a cultivating implement and a broadcasting implement, simultaneously. The resulting positioning of the broadcasting implement with respect to the cultivating implement leaves at least a portion of the cultivating implement disposed behind the broadcasting implement, thereby permitting cultivating and constituent broadcasting to be performed simultaneously.

What is claimed is:

1. An apparatus for combining planting implements comprising:
   a support frame, the support frame comprising a first substantially vertical member and a second substantially vertical member, each substantially vertical member having an upper end and a lower end, and a lateral member rigidly affixed to and connecting the upper ends of the substantially vertical members;
   a first bracket attached to an inside surface of the first substantially vertical member and forming a first lower connection point of a three-point hitch connection;
   a second bracket attached to an inside surface of the second substantially vertical member and foil ling a second lower connection point of a three-point hitch connection; and
   a connection bar rigidly affixed to an upper surface of the lateral member and providing an upper connection point of a three-point hitch connection,
   wherein the lower ends of the support frame are rigidly affixed to a frame of a conventional cultivating implement and the connection points of the apparatus receive a conventional broadcasting implement through a three-point hitch connection.

2. The apparatus of claim 1, wherein the support frame further comprises at least one rearward support member.

3. The apparatus of claim 2, wherein the rearward support member is rigidly affixed to and runs diagonally from an upper end of one of the substantially vertical members of the support frame to a rear section of the frame of a conventional cultivating implement.

4. The apparatus of claim 1, wherein the support frame further comprises at least one frontward support member.

5. The apparatus of claim 4, wherein the frontward support member is rigidly affixed to and runs diagonally from the lateral member of the support frame to a front section of the frame of a conventional cultivating implement.

6. The apparatus of claim 5, wherein the frontward support member further comprises a hole for receiving a bolt in the frame of the conventional cultivating implement.

7. The apparatus of claim 1, wherein at least a portion of the conventional cultivating implement is disposed behind the conventional broadcasting implement when the conventional broadcasting implement is attached to the support frame.

8. The apparatus of claim 1, wherein the conventional cultivating implement is a disk harrow.

9. The apparatus of claim 8, wherein the conventional broadcasting implement is a broadcast spreader.

10. The apparatus of claim 9, wherein the brackets are attached to the inside surfaces of the substantially vertical members approximately three-quarters of the way up the substantially vertical members.

11. The apparatus of claim 9, wherein the brackets are U-shaped.

12. The apparatus of claim 9, wherein the brackets are angled rearwardly to receive the broadcast spreader.

13. The apparatus of claim 1, wherein the connection bar further comprises a plurality of upper connection points.

14. The apparatus of claim 1, wherein the connection bar is vertically adjustable.

15. The apparatus of claim 1, wherein the substantially vertical members further comprise a plurality of locations for attaching the brackets thereto.

16. The apparatus of claim 1, wherein the substantially vertical members are vertically adjustable.

17. An apparatus for combining planting implements comprising:
- a support frame, the support frame comprising a pair of substantially vertical members and a lateral member, the lateral member being rigidly affixed to upper ends of the substantially vertical members;
- a pair of inwardly opposed brackets attached to respective inside surfaces of the substantially vertical members; and
- a connection bar rigidly affixed to an upper surface of the lateral member,
- wherein the brackets and connection bar receive a conventional broadcasting implement by means of a three-point hitch connection and the support frame is rigidly affixed to a conventional cultivating implement.

18. The apparatus of claim 17, wherein at least a portion of the conventional cultivating implement is disposed behind the conventional broadcasting implement when the conventional broadcasting implement is attached to the support frame.

19. The apparatus of claim 18, wherein the conventional cultivating implement is a disk harrow.

20. The apparatus of claim 19, wherein the conventional broadcasting implement is a broadcast spreader.

21. The apparatus of claim 17, wherein the connection bar is vertically adjustable.

22. The apparatus of claim 17, wherein the pair of substantially vertical members further comprise a plurality of locations for attaching the inwardly opposed brackets thereto.

23. The apparatus of claim 17, wherein the pair of substantially vertical members are vertically adjustable.

* * * * *